United States Patent
Yan et al.

(10) Patent No.: US 12,517,192 B1
(45) Date of Patent: Jan. 6, 2026

(54) METHOD FOR ESTIMATING NOISE OF SOFT MAGNETIC CORE

(71) Applicant: AEROSPACE INFORMATION RESEARCH INSTITUTE, CHINESE ACADEMY OF SCIENCES, Beijing (CN)

(72) Inventors: Bin Yan, Beijing (CN); Guangyou Fang, Beijing (CN); Wanhua Zhu, Beijing (CN)

(73) Assignee: AEROSPACE INFORMATION RESEARCH INSTITUTE, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 19/261,530

(22) Filed: Jul. 7, 2025

(30) Foreign Application Priority Data

Jul. 5, 2024 (CN) .......................... 202410896173.X

(51) Int. Cl.
  *G01R 33/04* (2006.01)
  *G01R 33/00* (2006.01)
  *G01R 35/00* (2006.01)

(52) U.S. Cl.
  CPC ......... *G01R 33/04* (2013.01); *G01R 33/0052* (2013.01); *G01R 35/00* (2013.01)

(58) Field of Classification Search
  CPC .... G01R 33/04; G01R 33/00; G01R 33/0052; G01R 33/0017; G01R 33/045; G01R 35/00; G01V 3/26
  See application file for complete search history.

(56) References Cited

U.S. PATENT DOCUMENTS

2019/0187008 A1* 6/2019 Schanz ................... G01L 3/105
2022/0342014 A1  10/2022 Cheng et al.

FOREIGN PATENT DOCUMENTS

CN   115877286 A     3/2023
CN   117524624 A *  2/2024  ............... H01F 3/04
(Continued)

OTHER PUBLICATIONS

First Chinese Office Action dated Nov. 23, 2024 for corresponding CN Application No. 202410896173.X (9 pages including English Abstract).
(Continued)

*Primary Examiner* — Son T Le
(74) *Attorney, Agent, or Firm* — Merchant & Gould P.C.

(57) ABSTRACT

The present disclosure provides a method for estimating a noise of a soft magnetic core, including: acquiring a soft magnetic core, where an excitation coil is wound around the soft magnetic core; measuring an impedance value of the excitation coil under a natural geomagnetic field by frequency sweeping, and determining a peak frequency point when the impedance value reaches a peak; measuring, under different direct current bias magnetic fields, an inductance value and a resistance value of the excitation coil at the peak frequency point along an axial direction of the soft magnetic core to respectively obtain an unsaturated inductance value and a resistance peak value of the soft magnetic core; and obtaining an equivalent noise of the soft magnetic core based on the unsaturated inductance value and the resistance peak value.

7 Claims, 5 Drawing Sheets
(4 of 5 Drawing Sheet(s) Filed in Color)

(56) References Cited

FOREIGN PATENT DOCUMENTS

DE 102009045237 B3 * 6/2011 ............. G01R 33/04
JP 2005164316 A * 6/2005

OTHER PUBLICATIONS

Wang Xizhen, et al., "The induction magnetometer in the Phase II of Chinese Meridian Project", Reviews of Geophysics and Planetary Physics, 2004, 55(1):31-36.
Wang Hao-Hua, et al., "Neural Network Identification Algorithm to Remove Lightning Interference from Nuclear Explosion EMP Detection", Nuclear Electronics & Detection Technology, 2021, 41(1):92-97.

* cited by examiner

METHOD FOR ESTIMATING NOISE OF SOFT MAGNETIC CORE

CROSS REFERENCE TO RELATED APPLICATION

This application claims priority to Chinese Patent Application No. 202410896173.X, filed on Jul. 5, 2024, the entire content of which is incorporated herein in its entirety by reference.

TECHNICAL FIELD

The present disclosure relates to a field of magnetic sensor performance testing, and in particular to a method for estimating a noise of a soft magnetic core.

BACKGROUND

A fluxgate magnetic-field sensor is a vector magnetic sensor that may measure quasi-static and low-frequency alternating magnetic fields by demodulating changes near excitation harmonics. It is generally composed of a soft magnetic core, an excitation coil, an induction coil and an excitation demodulation circuit. Through research, it has been found that a sensor noise may be originated from a soft magnetic core, a copper coil and a circuit, in which a noise of the soft magnetic core is a main source, while a thermal noise of the coil and a circuit noise may be ignored. However, over the years, no clear and physically-interpretable analytical expression is formed for an estimation of the noise in the soft magnetic core similar to that for an estimation of the thermal noise or the circuit noise, and thus no effective optimization algorithm is formed for a fluxgate sensor. Accordingly, there is a lack of evaluation index in an optimization process of a soft magnetic core material, making it difficult to connect a material research and development with a sensor design.

SUMMARY

The present disclosure provides a method for estimating a noise of a soft magnetic core, including: acquiring a soft magnetic core, where an excitation coil is wound around the soft magnetic core; measuring an impedance value of the excitation coil under a natural geomagnetic field by frequency sweeping, and determining a peak frequency point when the impedance value reaches a peak; measuring, under different direct current bias magnetic fields, an inductance value and a resistance value of the excitation coil at the peak frequency point along an axial direction of the soft magnetic core to respectively obtain an unsaturated inductance value and a resistance peak value of the soft magnetic core; and obtaining an equivalent noise of the soft magnetic core based on the unsaturated inductance value and the resistance peak value.

According to embodiments of the present disclosure, the method further includes: fitting, by using a high-order polynomial, the inductance values measured under the different direct current bias magnetic fields to obtain differential values of the inductance values; comparing magnitudes of the differential values under the different direct current bias magnetic fields, and determining the direct current bias magnetic field corresponding to a maximum differential value as an optimal excitation magnetic field; and exciting the soft magnetic core to a saturated magnetization state using the optimal excitation magnetic field.

According to embodiments of the present disclosure, the soft magnetic core is made of a material selected from permalloy, amorphous alloy, or nanocrystalline alloy.

According to embodiments of the present disclosure, the method further includes: balancing the natural geomagnetic field to zero using an electromagnet, so as to apply the different direct current bias magnetic fields to the soft magnetic core.

According to embodiments of the present disclosure, the method further includes: setting an annealing temperature of the soft magnetic core to different predetermined values, and performing a measurement on the soft magnetic core at each annealing temperature.

According to embodiments of the present disclosure, the method further includes: measuring a direct current resistance of the excitation coil, and determining a noise power spectral density of the excitation coil based on the direct current resistance and the resistance peak value.

According to embodiments of the present disclosure, the noise power spectral density of the excitation coil is determined based on the direct current resistance and the resistance peak value by:

$$V_{noise} = \sqrt{4kT(\text{Rind} + Rg)}$$

where $V_{noise}$ represents the noise power spectral density, k represents the Boltzmann constant, T represents an absolute temperature, Rind represents the resistance peak value, and Rg represents the direct current resistance of the excitation coil.

According to embodiments of the present disclosure, the method further includes: calculating a conversion coefficient between an induced voltage of the excitation coil and an external magnetic field based on the unsaturated inductance value by:

$$FS = -j2\pi f \times K1 \times L_p$$

where FS represents the conversion coefficient, f represents the peak frequency point, K1 represents a first constant, and $L_p$ represents the unsaturated inductance value.

According to embodiments of the present disclosure, the equivalent noise of the soft magnetic core is obtained based on the unsaturated inductance value and the resistance peak value by:

$$B_{nosie} = \frac{V_{noise}}{FS} = K2 \times \frac{\sqrt{Rind + Rg}}{L_p}$$

where $B_{noise}$ represents the equivalent noise of the soft magnetic core, $V_{noise}$ represents the noise power spectral density, FS represents the conversion coefficient, K2 represents a second constant, Rind represents the resistance peak value, Rg represents the direct current resistance of the excitation coil, and $L_p$ represents the unsaturated inductance value.

According to embodiments of the present disclosure, the method further includes: fabricating a fluxgate sensor using the soft magnetic core, and measuring a conversion sensitivity of the fluxgate sensor; placing the fluxgate sensor at a center of a shielded chamber, and measuring a noise spectral density value of an output voltage of the fluxgate sensor; calculating a ratio of the noise spectral density value to the conversion sensitivity to obtain a relationship between a noise of the soft magnetic core and a frequency; and checking a consistency with the estimated equivalent noise based on the relationship between the noise of the soft magnetic core and the frequency.

BRIEF DESCRIPTION OF THE DRAWINGS

This application contains at least one drawing executed in color. Copies of this patent application with color drawings will be provided by the Office upon request and payment of the necessary fee.

For more comprehensive understanding of the present disclosure and its advantages, reference will now be made to the following description in conjunction with the accompanying drawings. In the accompanying drawings.

DETAILED DESCRIPTION OF EMBODIMENTS

Embodiments of the present disclosure will be described below with reference to the accompanying drawings. However, it should be understood that these descriptions are merely exemplary and are not intended to limit the scope of the present disclosure. In the following detailed description, for ease of interpretation, many specific details are set forth to provide comprehensive understanding of embodiments of the present disclosure. However, it is clear that one or more embodiments may also be implemented without these specific details. In addition, in the following description, descriptions of well-known structures and technologies are omitted to avoid unnecessarily obscuring concepts of the present disclosure.

Terms are used herein for the purpose of describing specific embodiments only and are not intended to limit the present disclosure. The terms "including", "containing", etc. used herein indicate the presence of the feature, step, operation and/or component, but do not exclude the presence or addition of one or more other features, steps, operations or components.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or overly rigid manner.

Fluxgate sensors have advantages of small size, light weight, low power consumption, low noise, large dynamic range and good stability. Therefore, fluxgate sensors have been significantly applied in many fields, such as space magnetic field measurement, magnetic anomaly detection, underwater target detection and tracking, non-destructive testing, and positioning/navigation/timing. However, no clear and physically-interpretable analytical expression is formed for a main noise source of a fluxgate sensor, i.e., a noise of a soft magnetic core, making it difficult to perform an effective estimation on the noise of the soft magnetic core. In view of this problem, embodiments of the present disclosure propose a method for estimating a noise of a soft magnetic core.

The present disclosure provides a method for estimating a noise of a soft magnetic core, so as to at least partially solve technical problems such as a difficulty in optimizing a fluxgate sensor, an unstable performance of a fluxgate sensor, and a difficulty in accurately predicting and reducing a noise level in a practical application, which are caused by a lack of a clear method for estimating the noise of the soft magnetic core at present.

Figure 1:
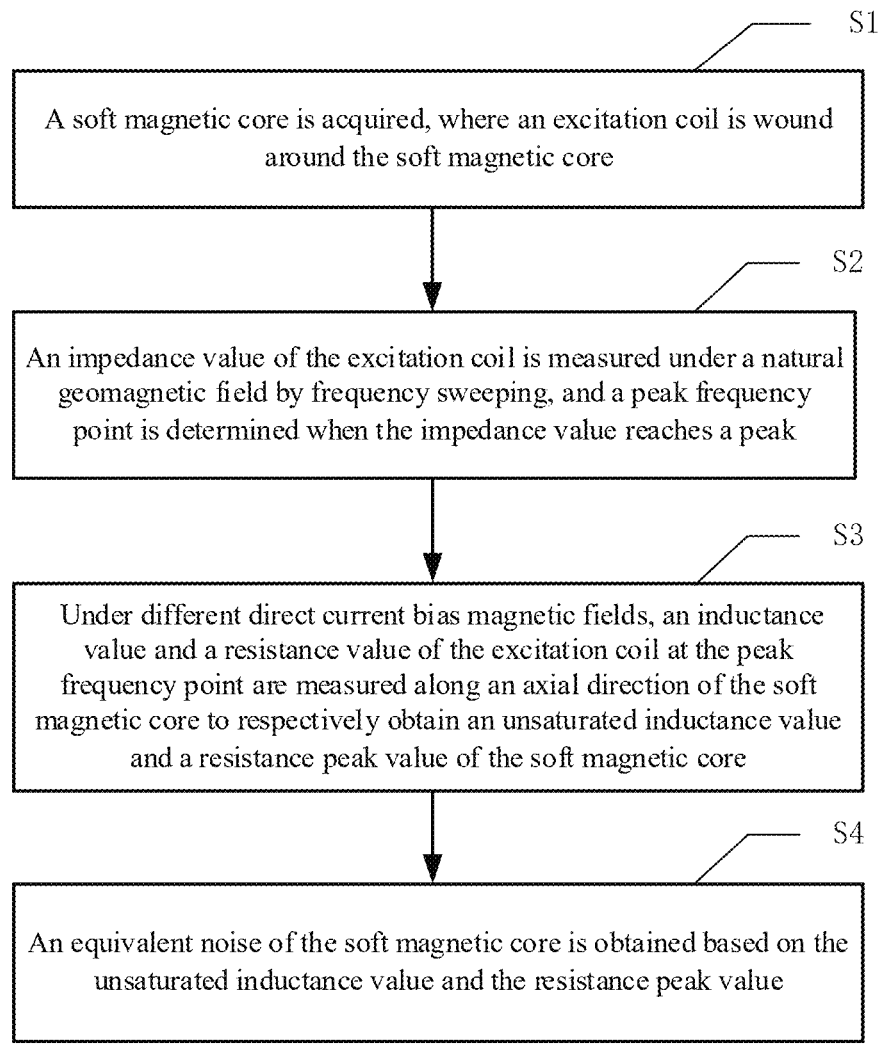
FIG. 1 schematically shows a schematic flowchart of a method for estimating a noise of a soft magnetic core provided in embodiments of the present disclosure.

FIG. 1 schematically shows a schematic flowchart of a method for estimating a noise of a soft magnetic core provided in embodiments of the present disclosure.

As shown in FIG. 1, the method for estimating the noise of the soft magnetic core in the embodiments includes operation S1 to operation S4.

In operation S1, a soft magnetic core is acquired, where an excitation coil is wound around the soft magnetic core.

In operation S2, an impedance value of the excitation coil is measured under a natural geomagnetic field by frequency sweeping, and a peak frequency point is determined when the impedance value reaches a peak.

In operation S3, under different direct current bias magnetic fields, an inductance value and a resistance value of the excitation coil at the peak frequency point are measured along an axial direction of the soft magnetic core to respectively obtain an unsaturated inductance value and a resistance peak value of the soft magnetic core.

In operation S4, an equivalent noise of the soft magnetic core is obtained based on the unsaturated inductance value and the resistance peak value.

In embodiments of the present disclosure, the soft magnetic core is made of a material selected from permalloy, amorphous alloy, or nanocrystalline alloy.

Specifically, when acquiring the soft magnetic core, it is needed to first select the material of the soft magnetic core. A soft magnetic core with high permeability and low noise is a critical component of the fluxgate sensor, and magnetic properties of the soft magnetic core play a decisive role in a performance index of the sensor. Common options of a soft magnetic core material for a fluxgate sensor mainly include permalloy, cobalt-based/iron-based/cobalt-iron-based amorphous alloy, cobalt-based/iron-based/cobalt-iron-based nanocrystalline alloy, etc.

Exemplarily, the permalloy was once a commercial iron-nickel alloy, but now generally refers to a nickel-iron alloy. The permalloy has an extremely-high permeability and a low magnetic loss under a weak magnetic field, and may be processed to a thickness of tens of microns through a rolling process. However, a width of the permalloy still remains on an order of millimeters, which limits a further miniaturization.

Exemplarily, the amorphous alloy, also known as a metallic glass, refers to a disordered and lattice-free alloy formed by rapid cooling of a liquid alloy. The amorphous alloy is a soft magnetic material with high permeability developed in the 1980s. Compared with the traditional permalloy, a cobalt-based amorphous soft magnetic alloy has a high permeability, a low coercivity and a zero magnetostriction. With a maturity of a cobalt-based amorphous wire technology, a diameter of the magnetic core may be controlled within hundreds of microns, which promotes a further miniaturization of the sensor. Thus, the amorphous alloy is currently a preferred soft magnetic core material.

Exemplarily, the nanocrystalline soft magnetic material is a material having a mixed microstructure of nanoscale microcrystals and amorphous phrases, which is formed by a highly-controlled annealing process based on the amorphous alloy. Compared with the traditional permalloy soft magnetic material and the amorphous soft magnetic material, a nanocrystalline ultra-thin ribbon may be used to reduce a volume of a magnetic device and lower a loss of the magnetic device due to its material properties such as high saturation magnetism, low coercivity, high initial permeability and high Curie temperature. The nanocrystalline ultra-thin ribbon is a new magnetic material with a better comprehensive magnetic performance and shows significant advantages in the pursuit of miniaturization, lightweight and complex temperature scenarios.

It may be understood that all the above-mentioned materials may be used as the soft magnetic core material for the fluxgate sensor to gather magnetism and improve a magnetic-voltage conversion efficiency.

Further, based on a structural composition of the fluxgate, the performance of the soft magnetic core is related to the excitation coil tightly wound thereon and may be estimated by measuring the impedance of the excitation coil. Thus, in some exemplary embodiments, an inductance (Lc) and a resistance (Rc) of the excitation coil containing the soft magnetic core are measured using a precision impedance analyzer (such as Agilent 4294a impedance analyzer), that is, a measurement option of "inductance-resistance" is selected.

Figure 2:
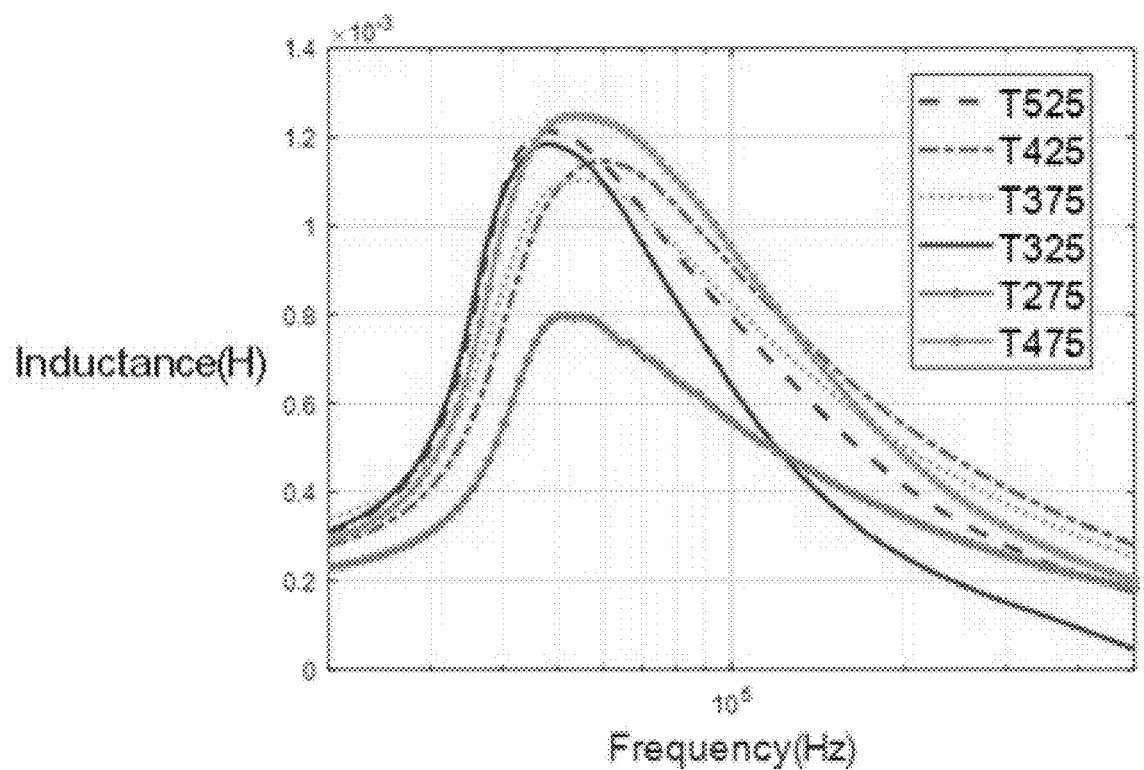
FIG. 2 schematically shows a schematic diagram of a result of a frequency-sweep measurement for an inductance value of an excitation coil under a natural geomagnetic field provided in embodiments of the present disclosure.
Figure 3:
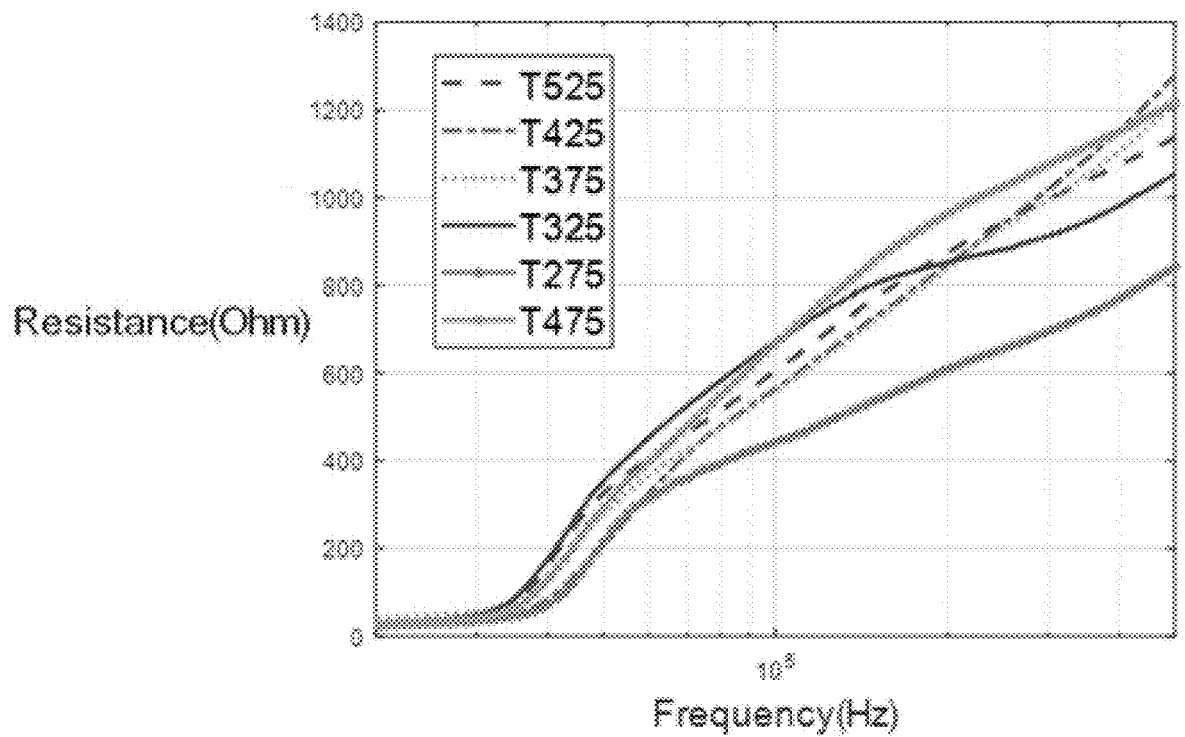
FIG. 3 schematically shows a schematic diagram of a result of a frequency-sweep measurement for a resistance value of an excitation coil under a natural geomagnetic field provided in embodiments of the present disclosure.

FIG. 2 and FIG. 3 schematically show schematic diagrams of results of a frequency-sweep measurement for an inductance and a resistance of an excitation coil under a natural geomagnetic field provided in embodiments of the present disclosure, respectively.

Specifically, first, the measurement is performed on the excitation coil under the natural geomagnetic field, and the measured inductance varies with a frequency. Taking an amorphous wire with a diameter of 0.1 mm and a length of 2 mm, and an excitation coil with a wire diameter of 0.1 mm and 500 turns as an example, as shown in FIG. 2 and FIG. 3, when the inductance reaches a peak, a peak frequency point is approximately 53 kHz, indicating that the permeability reaches a peak at about 53 kHz, and a magnetic-voltage conversion coefficient also reaches a peak at this point. In addition, the resistance of the excitation coil increases rapidly after 40 kHz, indicating that the loss of the soft magnetic core increases after 40 kHz and the noise also increases.

Further, in embodiments of the present disclosure, an annealing temperature of the soft magnetic core is set to different predetermined values, and a measurement is performed on the soft magnetic core at each annealing temperature.

Exemplarily, continuing to refer to FIG. 2 and FIG. 3, six cases are listed, where the annealing temperatures are 275° C., 325° C., 375° C., 425° C., 475° C. and 525° C. respectively, and similar conclusions are obtained.

In embodiments of the present disclosure, the method further includes: balancing the natural geomagnetic field to zero using an electromagnet, so as to apply the different direct current bias magnetic fields to the soft magnetic core. In this way, under an action of different direct current bias magnetic fields ($H_{dc}$), a relationship between the impedance value of the coil and the frequency is measured along a length direction of the soft magnetic core.

Figure 4:
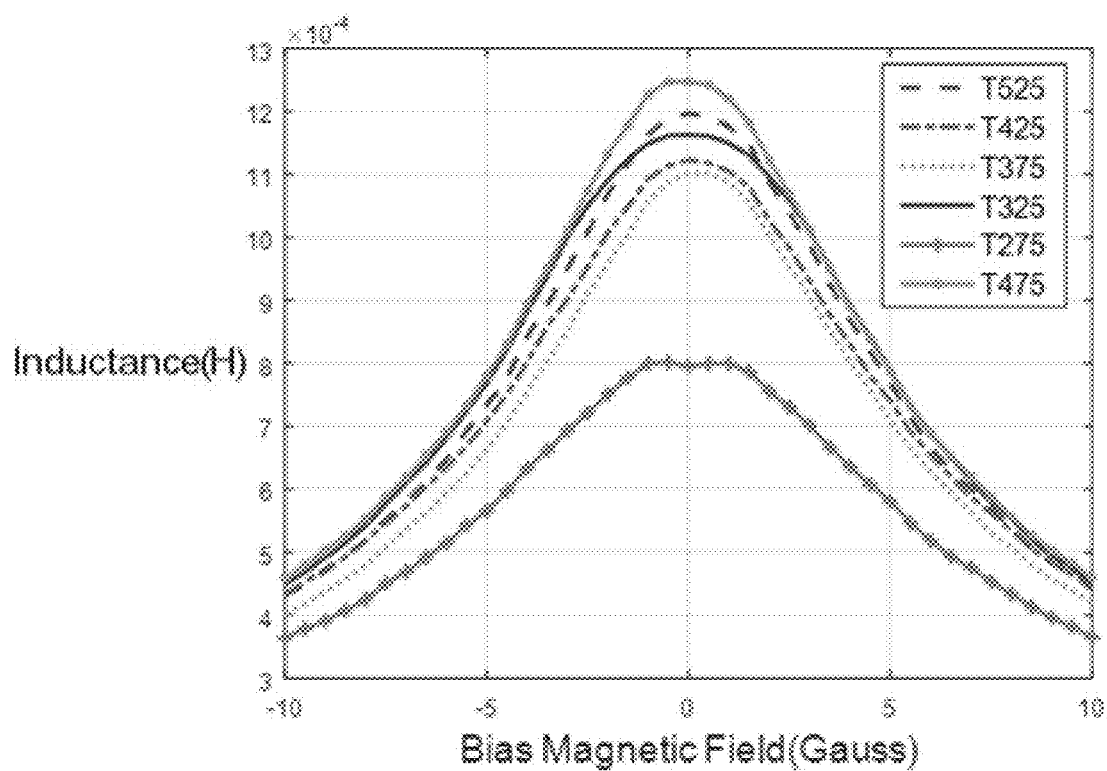
FIG. 4 schematically shows a schematic diagram of changes in the inductance value under different direct current bias magnetic fields provided in embodiments of the present disclosure.

Exemplarily, under different direct current bias magnetic fields, the impedance analyzer provides a source current of 20 mA, and a scanning bandwidth ranges from 1 kHz to 500 kHz (frequency range). Then, the inductance and the resistance at the previously determined peak frequency point are recorded. The 20 mA excitation current used in the test simulates an excitation current of an actual sensor. Referring to FIG. 4, a measurement process is repeatedly performed under different direct current bias magnetic fields, including zero field, +5 Gauss direct current field (+50000 nt), +10 Gauss direct current field (+100000 nt), −5 Gauss direct current field (−50000 nt), and −10 Gauss direct current field (−100000 nt), along the direction of the soft magnetic core. Optionally, a step size may be 0.5 Gauss or less. Changes in the inductance values under six different annealing temperatures and different direct current bias magnetic fields are shown in FIG. 4.

Generally, the inductance value of the coil conforms to the following rule:

$$L_p = \frac{N^2 \mu_0 \mu_{app} \times \pi \times S}{l}$$

where $L_p$ represents an unsaturated inductance of the coil, N represents a number of turns of the coil, $\mu_0$ represents a vacuum permeability, $\mu_{app}$ represents an effective permeability of the soft magnetic core, S represents a cross section of the soft magnetic core, and l represents a length of the soft magnetic core.

According to the Faraday's law of electromagnetic induction, a conversion coefficient between an induced voltage of the coil and an external magnetic field is calculated by:

$$FS = \frac{e(f)}{B(f)} = -j2\pi f \mu_{app} NS$$

where FS represents a magnetic-voltage conversion coefficient, e(f) represents an output voltage, B(f) represents a magnetic induction intensity, and f represents a frequency.

Accordingly, based on the unsaturated inductance value, the conversion coefficient between the induced voltage of the excitation coil and the external magnetic field may be calculated by:

$$FS = -j2\pi f \times K1 \times L_p$$

where FS represents the conversion coefficient, f represents the peak frequency point, K1 represents a first constant, and $L_p$ represents the unsaturated inductance value.

In embodiments of the present disclosure, the method further includes: fitting, by using a high-order polynomial, the inductance values measured under the different direct current bias magnetic fields to obtain differential values of the inductance values; comparing magnitudes of the differential values under the different direct current bias magnetic fields, and determining the direct current bias magnetic field corresponding to a maximum differential value as an optimal excitation magnetic field; and exciting the soft magnetic core to a saturated magnetization state using the optimal excitation magnetic field.

Specifically, the measured inductance values are fitted using a high-order polynomial. In order to reduce a sum of squared errors (SSE), a 9th-order polynomial is used for the fitting in some exemplary embodiments:

$$L_p(H) = p1 \times H^9 + p2 \times H^8 + p3 \times H^7 + p4 \times H^6 + p5 \times H^5 + p6 \times H^4 + p7 \times H^3 + p8 \times H^2 + p9 \times H + p10$$

where parameters p1 to p9 are coefficients of the polynomial. Thus, the differential values of the inductance values may be obtained by:

$$L_p\text{diff}(H) = 9 \times p1 \times H^8 + 8 \times p2 \times H^7 + 7 \times p3 \times H^6 + 6 \times p4 \times H^5 + 5 \times p5 \times H^4 + 4 \times p6 \times H^3 + 3 \times p7 \times H^2 + 2 \times p8 \times H + p9$$

Figure 5:
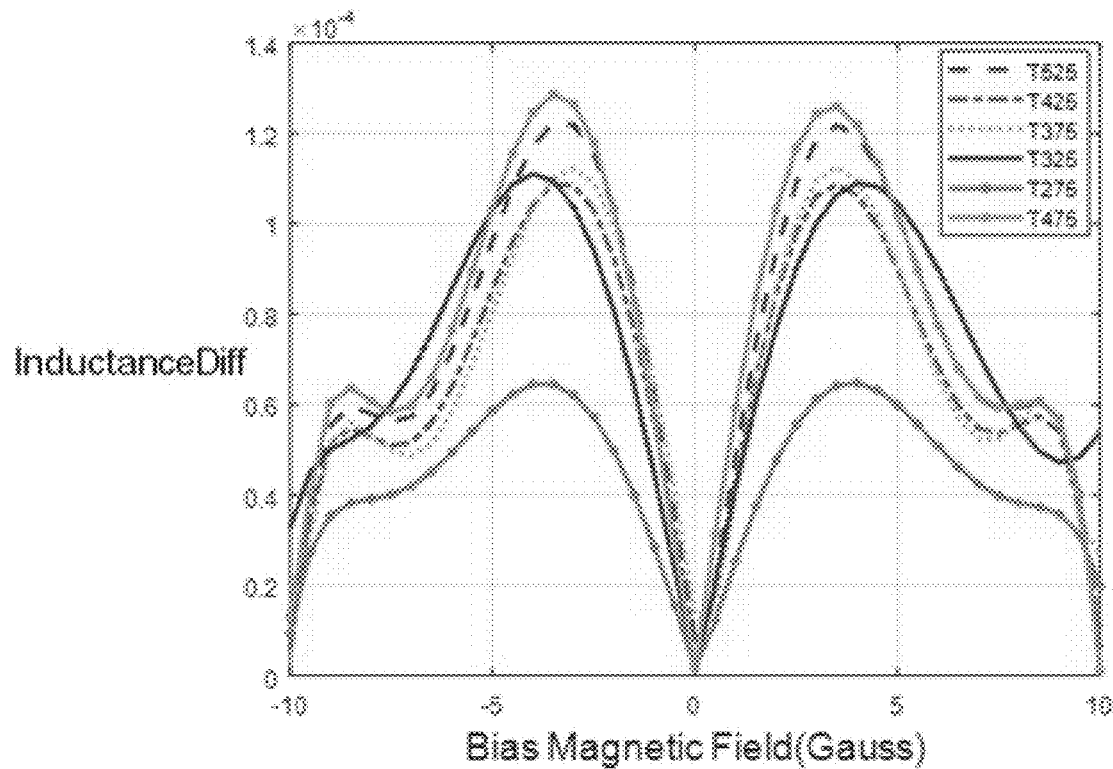
FIG. 5 schematically shows a schematic diagram of differential values of the inductance values of the coil under different direct current bias magnetic fields provided in embodiments of the present disclosure.

FIG. 5 schematically shows a schematic diagram of differential values of the inductance values of the coil under different direct current bias magnetic fields provided in embodiments of the present disclosure.

As shown in FIG. 5, the soft magnetic core approaches saturation under a magnetic field of about 3.5 Gauss. At this point, a rate of change in the permeability (directly proportional to the inductance of the coil) of the soft magnetic core reaches the maximum, and an optimal excitation magnetic field for the soft magnetic core may be obtained.

In embodiments of the present disclosure, the method further includes: measuring a direct current resistance of the excitation coil, and determining a noise power spectral density of the excitation coil based on the direct current resistance and the resistance peak value.

Specifically, similar to the inductance value, the resistance value of the coil is measured at the peak frequency point under different bias magnetic fields. The resistance peak value mainly reflects an internal stress noise of the soft magnetic core.

Figure 6:
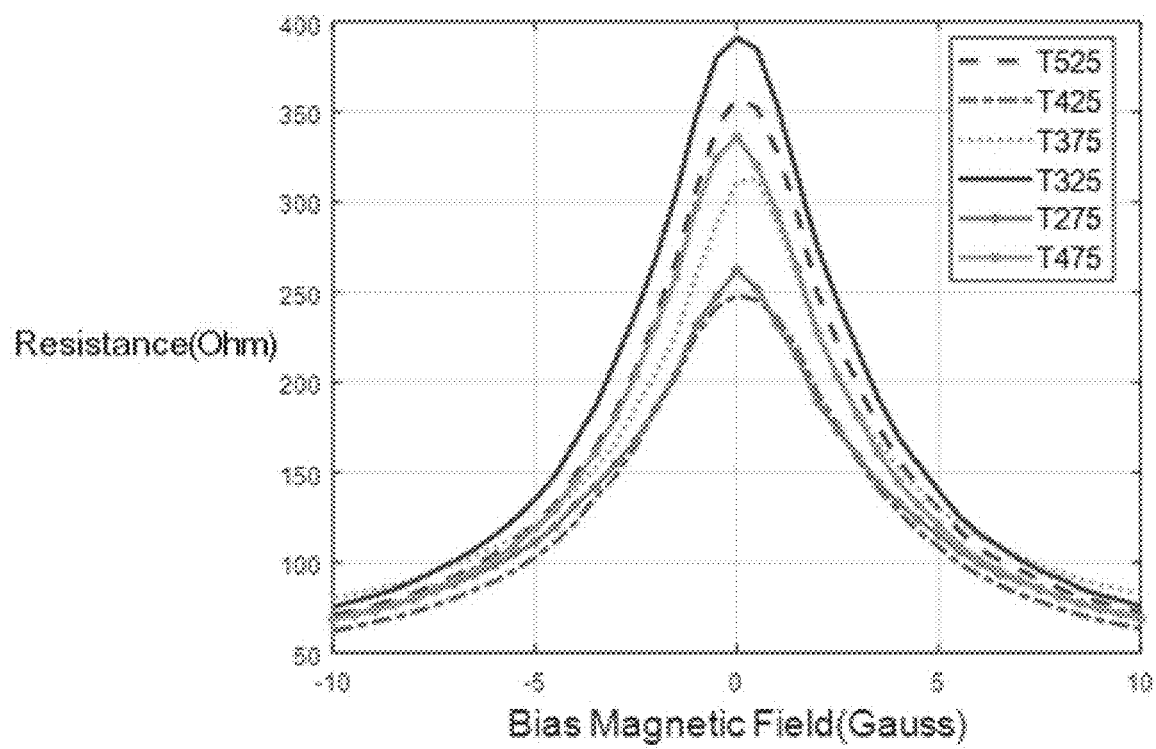
FIG. 6 schematically shows a schematic diagram of resistance values of the coil under different direct current bias magnetic fields provided in embodiments of the present disclosure.

FIG. 6 schematically shows a schematic diagram of resistance values of the coil under different direct current bias magnetic fields provided in embodiments of the present disclosure.

As shown in FIG. 6, the resistance value in the coil decreases with an increase of a value of a bias field, showing a positive correlation. The resistance value under a negative bias field is symmetrical to the resistance value under a positive bias field. The resistance peak value appears under a zero magnetic field, and different soft magnetic cores in the coil have different resistance peak values. Assuming that the resistance peak value of the soft magnetic core related to the noise (including Barkhausen noise and thermal noise) is represented by Rind, and the direct current resistance of a coil wire is represented by Rg, then the noise power spectral density of a total resistance R may be expressed as:

$$V_{noise} = \sqrt{4kT(\text{Rind} + Rg)} = \sqrt{4kTR}$$

where $V_{noise}$ represents the noise power spectral density, k represents the Boltzmann constant, T represents an absolute temperature, Rind represents the resistance peak value, and Rg represents the direct current resistance of the excitation coil.

Further, the equivalent noise of the soft magnetic core may be obtained based on the unsaturated inductance value and the resistance peak value by:

$$B_{nosie} = \frac{V_{noise}}{FS} = \frac{\sqrt{4kT(\text{Rind} + Rg)}}{-j2\pi f \times K1 \times L_p} = K2 \times \frac{\sqrt{\text{Rind} + Rg}}{L_p} = K3 \times \frac{\sqrt{R}}{L_p}$$

where $B_{noise}$ represents the equivalent noise of the soft magnetic core, $V_{noise}$ represents the noise power spectral density, FS represents the conversion coefficient, K2 represents a second constant, K3 represents a third constant, Rind represents the resistance peak value, Rg represents the direct current resistance of the excitation coil, and $L_p$ represents the unsaturated inductance value.

Figure 7:
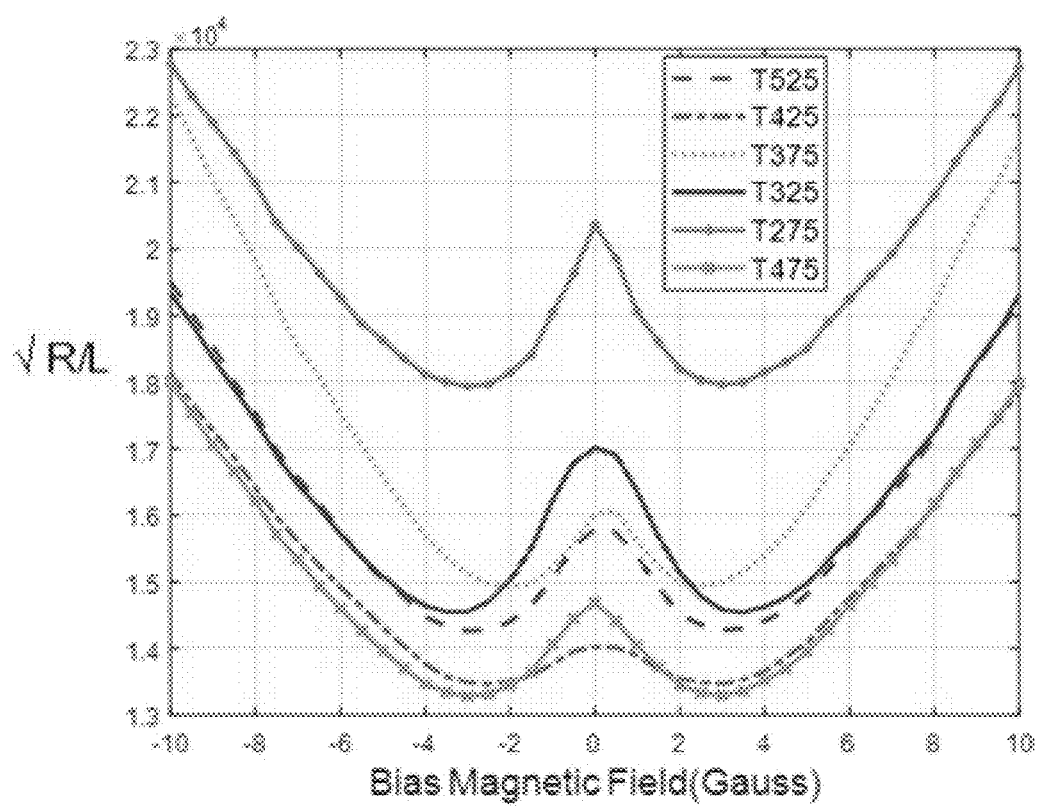
FIG. 7 schematically shows a schematic diagram of equivalent noise simulation values under different bias magnetic fields provided in embodiments of the present disclosure.

Specifically, an equivalent input magnetic field noise, i.e., the equivalent noise, is defined as a magnetic field noise visible from an input side of the sensor. Finally, the equivalent input magnetic field noise is estimated, and an estimation result is shown in FIG. 7.

According to embodiments of the present disclosure, the method further includes: fabricating a fluxgate sensor using the soft magnetic core, and measuring a conversion sensitivity of the fluxgate sensor; placing the fluxgate sensor at a center of a shielded chamber, and measuring a noise spectral density value of an output voltage of the fluxgate sensor; calculating a ratio of the noise spectral density value to the conversion sensitivity to obtain a relationship between a noise of the soft magnetic core and a frequency; and checking a consistency with the estimated equivalent noise based on the relationship between the noise of the soft magnetic core and the frequency.

Specifically, in order to verify an accuracy of the method for estimating the noise of the soft magnetic core provided in embodiments of the present disclosure, six probes of the fluxgate sensor are fabricated and tested. Induction coils and signal conditioning circuits of the six probes have the same parameters.

In this process, a value (in a unit of mV/nT) of the conversion sensitivity of the sensor is first represented, so as to compare the magnetic-voltage conversion coefficients of the sensor. The sensitivity value may be measured using a dynamic signal analyzer (e.g., Agilent 35670A) and a Helmholtz coil (e.g., Bartington HC1).

Figure 8:
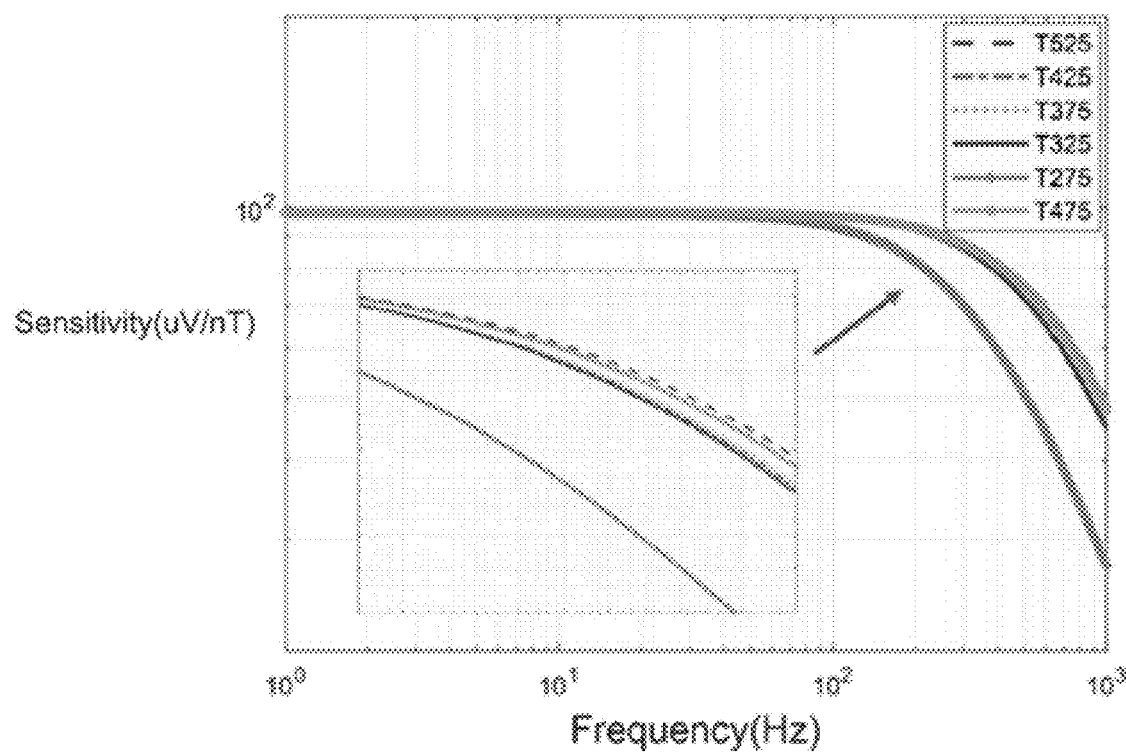
FIG. 8 schematically shows a schematic diagram of a conversion sensitivity of a sensor corresponding to an amorphous wire soft magnetic core at different annealing temperatures provided in embodiments of the present disclosure.

FIG. 8 schematically shows a schematic diagram of a conversion sensitivity of a sensor corresponding to an amorphous wire soft magnetic core at different annealing temperatures provided in embodiments of the present disclosure.

As shown in FIG. 8, the sensitivity values of the six sensors measured at 1 Hz are almost the same, but the six sensors have different operating frequency bands. An operating bandwidth of sensor T275 is significantly smaller than that of other sensors. This is mainly due to a decrease in an initial permeability of the soft magnetic core at the annealing temperature of 275° C., which leads to a decrease in a high-frequency open-loop gain of the sensor T275. In this case, a deep negative feedback condition is not met, resulting in a decrease in a high-frequency closed-loop gain and a reduction in the bandwidth.

Further, the sensor is placed at a center of a shielded chamber. An output noise spectral density value is measured using the Agilent 35670A analyzer. The measured output voltage noise spectral density is divided by the measured sensitivity value to obtain a relationship between the equivalent input magnetic field noise and the frequency.

Figure 9:
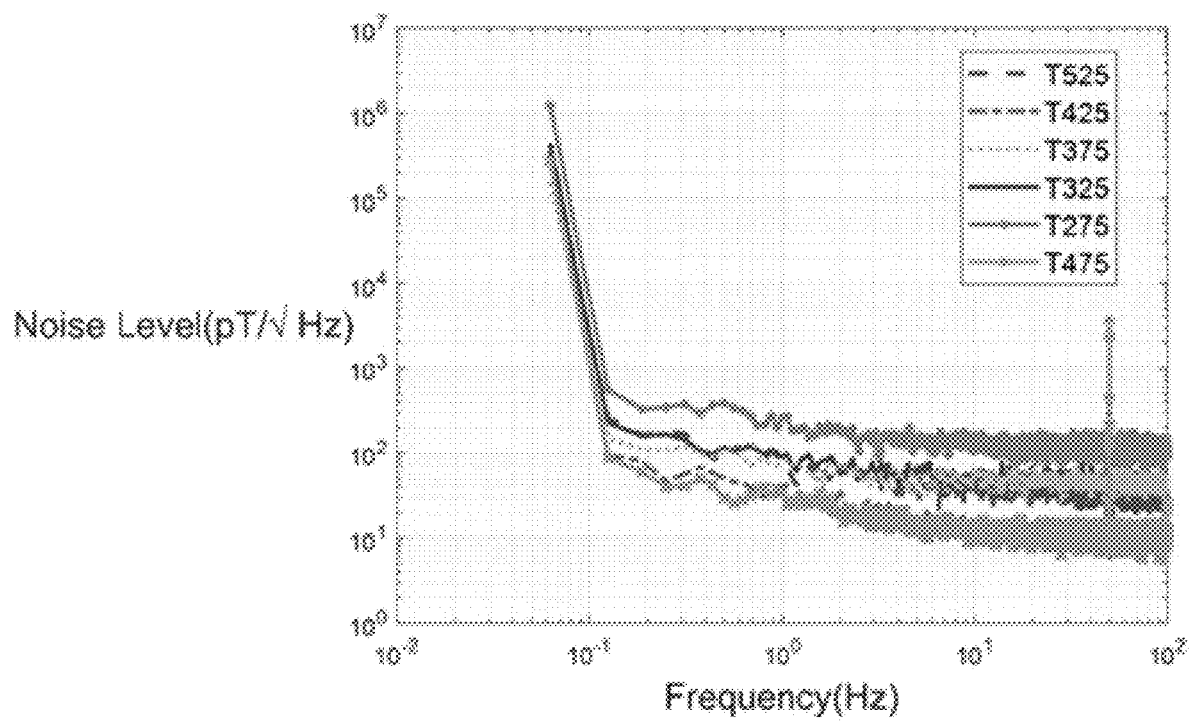
FIG. 9 schematically shows a schematic diagram of a noise level of a sensor corresponding to an amorphous wire soft magnetic core at different annealing temperatures provided in embodiments of the present disclosure.

FIG. 9 schematically shows a schematic diagram of a noise level of a sensor corresponding to an amorphous wire soft magnetic core at different annealing temperatures provided in embodiments of the present disclosure.

As shown in FIG. 9, the sensors with different soft magnetic cores have great difference in the input magnetic field noise, and an overall result is highly consistent with the simulation result shown in FIG. 7, so that an effectiveness of the method may be verified.

According to the method for estimating the noise of the soft magnetic core provided in embodiments of the present disclosure, it is possible to predict a noise performance of a magnetic core during a design phase, thereby avoiding an unnecessary trial-and-error process and reducing a trial-and-error cost. Moreover, it is possible to estimate noises of a large number of magnetic cores in a short time to rapidly screen the magnetic cores that meet requirements, thereby accelerating a screening process and improving a production efficiency.

The method for estimating the noise of the soft magnetic core provided in the present disclosure may be implemented to estimate an equivalent input magnetic field noise of a sensor by analyzing impedance characteristics of the soft magnetic core and the excitation coil tightly wound around the soft magnetic core, and a complete and effective method for estimating the noise is formed, which not only provides an important reference for a design and optimization of the fluxgate sensor, but also points out a direction for improving a sensor performance.

Those skilled in the art may understand that the features described in various embodiments and/or claims of the present disclosure may be combined/integrated in various ways, even if such combinations or integrations are not explicitly described in the present disclosure. In particular, the features described in various embodiments and/or claims of the present disclosure may be combined/integrated in various ways without departing from the spirit and teachings of the present disclosure. All these combinations and/or integrations fall within the scope of the present disclosure.

The present disclosure has been shown and described with reference to specific exemplary embodiments of the present disclosure. However, those skilled in the art should understand that various changes in form and detail may be made to the present disclosure without departing from the spirit and scope of the present disclosure defined by the appended claims and their equivalents. Therefore, the scope of the present disclosure should not be limited to the above-mentioned embodiments, but should be determined not only by the appended claims but also by the equivalents of the appended claims.

What is claimed is:

1. A method for estimating a noise of a soft magnetic core, comprising:
acquiring a soft magnetic core, wherein an excitation coil is wound around the soft magnetic core;
measuring an impedance value of the excitation coil under a natural geomagnetic field by frequency sweeping, and determining a peak frequency point when the impedance value reaches a peak;
measuring, under different direct current bias magnetic fields, an inductance value and a resistance value of the excitation coil at the peak frequency point along an axial direction of the soft magnetic core to respectively obtain an unsaturated inductance value and a resistance peak value of the soft magnetic core; and
obtaining an equivalent noise of the soft magnetic core based on the unsaturated inductance value and the resistance peak value,
wherein the method further comprises:
measuring a direct current resistance of the excitation coil, and determining a noise power spectral density of the excitation coil based on the direct current resistance and the resistance peak value, and
calculating a conversion coefficient between an induced voltage of the excitation coil and an external magnetic field based on the unsaturated inductance value by:

$$FS = -j2\pi f \times K1 \times L_p$$

wherein FS represents the conversion coefficient, f represents the peak frequency point, K1 represents a first constant, and $L_p$ represents the unsaturated inductance value,
wherein the equivalent noise of the soft magnetic core is obtained based on the unsaturated inductance value and the resistance peak value by:

$$B_{noise} = \frac{V_{noise}}{FS} = K2 \times \frac{\sqrt{Rind + Rg}}{L_p}$$

wherein $V_{noise}$ represents the noise power spectral density, K2 represents a second constant, Rind represents the resistance peak value, and Rg represents the direct current resistance of the excitation coil.

2. The method according to claim 1, further comprising:
fitting, by using a high-order polynomial, the inductance values measured under the different direct current bias magnetic fields to obtain differential values of the inductance values;
comparing magnitudes of the differential values under the different direct current bias magnetic fields, and determining the direct current bias magnetic field corresponding to a maximum differential value as an optimal excitation magnetic field; and
exciting the soft magnetic core to a saturated magnetization state using the optimal excitation magnetic field.

3. The method according to claim 1, wherein the soft magnetic core is made of a material selected from permalloy, amorphous alloy, or nanocrystalline alloy.

4. The method according to claim 1, further comprising:
balancing the natural geomagnetic field to zero using an electromagnet, so as to apply the different direct current bias magnetic fields to the soft magnetic core.

5. The method according to claim 1, further comprising:
setting an annealing temperature of the soft magnetic core to different predetermined values, and performing a measurement on the soft magnetic core at each annealing temperature.

6. The method according to claim 1, wherein the noise power spectral density of the excitation coil is determined based on the direct current resistance and the resistance peak value by:

$$V_{noise} = \sqrt{4kT(Rind + rg)}$$

wherein k represents the Boltzmann constant, T represents an absolute temperature.

7. The method according to claim 1, further comprising:
fabricating a fluxgate sensor using the soft magnetic core, and measuring a conversion sensitivity of the fluxgate sensor;

placing the fluxgate sensor at a center of a shielded chamber, and measuring a noise spectral density value of an output voltage of the fluxgate sensor;

calculating a ratio of the noise spectral density value to the conversion sensitivity to obtain a relationship between a noise of the soft magnetic core and a frequency; and checking a consistency with the estimated equivalent noise based on the relationship between the noise of the soft magnetic core and the frequency.

\* \* \* \* \*